Patented Oct. 16, 1951

2,571,844

UNITED STATES PATENT OFFICE 2,571,844

CERAMIC COMPOSITION

André Danzin and Jean Calis, Paris, France, assignors to Compagnie Generale de Telegraphie Sans Fil, a corporation of France No Drawing. Application June 15, 1948, Serial No. 33,235. In France July 19, 1947

6 Claims. (Cl. 106—46)

This invention relates to a method for forming ceramic bodies and to the articles formed thereby.

More particularly, it relates to a method for controlling the coefficient of expansion of a ceramic product.

An object of the invention is a method for making ceramic bodies having a definite range of coefficients of expansion.

Another object is a method for making ceramic bodies having specific coefficients of expansion.

Under another aspect, it is an object of our invention to provide for a method of manufacturing ceramic bodies which are adapted to be united with glass or metal parts.

A still more specific object is a method for making ceramic bodies which are adapted to be incorporated in electronic tubes and to be united with the portions of the tube that consist of metal or glass.

The novel features which we consider characteristic of our invention are set forth in particular in the appended claims. The invention itself, together with additional objects and advantages thereof, will be understood best from the following description.

We have found that the coefficient of expansion of ceramic articles can be controlled by forming the article from a clay composition and incorporating in the composition specific amounts of alumina so as to obtain a coefficient of expansion in accordance with the percentage of alumina present in the final article. Our invention is based on the observation that non-aluminous ceramic compositions are known which have a coefficient of expansion equal or in excess to $60 \times 10^{-7}$, while on the other hand porcelain compositions are known which have an expansion coefficient equal to or below $45 \times 10^{-7}$. Based on these observations, we have found that by suitably varying the alumina contents of the composition, a ceramic mass can be obtained which has a coefficient of expansion within the values just mentioned, that is in a range between $45 \times 10^{-7}$ and $60 \times 10^{-7}$.

The clay compositions employed in our invention preferably are mixtures of clay and kaolin. The necessary density of the mixture is obtained by addition of a flux, preferably an alkaline earth. However, a flux material of any other kind such as, for instance, an alkali or lead containing material may be also used provided that the amount of flux is properly adjusted so that the coefficient of expansion of the composition does not come outside the forementioned range.

The following balanced formulae of ceramic materials having an expansion coefficient as indicated are stated by way of illustration and are not to be understood in a limiting sense:

Example I

| | |
|---|---|
| Purified kaolin | 70.4 |
| Calcined alumina | 27 |
| Calcium carbonate | 2.29 |
| Dolomite | 6.4 |
| Firing temperature | 1,360° C. |
| Coefficient of expansion | $46 \times 10^{-7}$ |

Example II

| | |
|---|---|
| Clay | 5.5 |
| Purified kaolin | 56 |
| Calcined alumina | 38 |
| Calcium carbonate | 2.29 |
| Dolomite | 6.4 |
| Firing temperature | 1,390 to 1,420° C. |
| Coefficient of expansion | $52.5 \times 10^{-7}$ |

Example III

| | |
|---|---|
| Purified kaolin | 56.91 |
| Calcined alumina | 39.16 |
| Calcium carbonate | 2.29 |
| Dolomite | 6.4 |
| Firing temperature | 1,370° C. |
| Coefficient of expansion | $59 \times 10^{-7}$ |

The particular value of these compositions is that they furnish ceramic masses which readily suggest use for purposes where the ceramic body must be united with glass or metal bodies which have coefficients of expansion within the range of $45 \times 10^{-7}$ and $60 \times 10^{-7}$.

For instance, the bodies made of the composition set forth above as the second example are suited for being joined to glass bodies in radio tubes and the same composition is also fitted for union with parts consisting of an iron-nickel-cobalt alloy and of molybdenum. This affords the advantage that glass, metal and the ceramic may be placed in one and the same vacuum tube and that it is not necessary to change the chemical compositions and the methods of manufacture of the glass and metal parts from those ordinarily used in the radio industry.

Another advantage of the ceramic products according to our invention is their high thermic resistance which makes them particularly adapted for the necessary connection and joining with other parts.

Without further analysis, the foregoing will so fully reveal the gist of our invention that others can by applying current knowledge readily adapt it for various applications without omitting features that, from the standpoint of prior art, fairly constitute essential characteristics of the generic or specific aspects of this invention, and, therefore, such adaptations should and are intended to be comprehended within the meaning and range of equivalence of the following claims.

What we claim as new and desire to secure by Letters Patent is:

1. A ceramic composition comprising the following parts of ingredients: purified kaolin 70.4, calcined alumina 27, calcium carbonate 2.29, and dolomite 6.4.

2. A ceramic composition comprising the following parts of ingredients: purified kaolin 56.91, calcined alumina 39.16, calcium carbonate 2.29, and dolomite 6.4.

3. A fired ceramic material having a coefficient of expansion in the range between $45 \times 10^{-7}$ and $60 \times 10^{-7}$, which comprises kaolin, clay, about 27–39% calcined alumina and a minor amount of an alkaline earth fluxing agent.

4. A fired ceramic material having a coefficient of expansion in the range between $45 \times 10^{-7}$ and $60 \times 10^{-7}$, which comprises 56–70% kaolin, about 27–39% calcined alumina, about 2.3% calcium carbonate, and about 6.4% dolomite.

5. A fired ceramic material having a coefficient of expansion in the range between $45 \times 10^{-7}$ and $60 \times 10^{-7}$, which comprises 56–70% kaolin, about 27–39% calcined alumina, about 2.3% calcium carbonate, about 6.4% dolomite, and about 5.5% clay.

6. An electrical article, like an electron tube, having parts made of an alumina enriched clay with a coefficient of expansion between $45 \times 10^{-7}$ and $60 \times 10^{-7}$ comprising a mixture of clay, kaolin, an alkaline earth fluxing agent, and about 27–39% calcined alumina.

ANDRÉ DANZIN.
JEAN CALIS.

REFERENCES CITED

The following references are of record in the file of this patent:

UNITED STATES PATENTS

| Number | Name | Date |
|---|---|---|
| 1,409,953 | Jeffery | Mar. 31, 1922 |
| 1,572,730 | Locke et al. | Feb. 9, 1926 |
| 1,682,250 | Riddle | Aug. 28, 1928 |
| 2,154,069 | Fessler et al. | Apr. 11, 1939 |
| 2,419,290 | Schaefer | Apr. 22, 1947 |